(12) United States Patent
Bharghavan et al.

(10) Patent No.: US 11,494,777 B2
(45) Date of Patent: Nov. 8, 2022

(54) ENRICHING TRANSACTION REQUEST DATA FOR MAINTAINING LOCATION PRIVACY WHILE IMPROVING FRAUD PREVENTION SYSTEMS ON A DATA COMMUNICATION NETWORK WITH USER CONTROLS INJECTED TO BACK-END TRANSACTION APPROVAL REQUESTS IN REAL-TIME WITH TRANSACTIONS

(71) Applicant: OnDot Systems, Inc., San Jose, CA (US)

(72) Inventors: Vaduvur Bharghavan, Morgan Hill, CA (US); Sungwook Han, Santa Clara, CA (US); Zhiqiang Zhang, San Ramon, CA (US)

(73) Assignee: OnDot Systems, Inc., San Jose, CA (US)

( * ) Notice: Subject to any disclaimer, the term of this patent is extended or adjusted under 35 U.S.C. 154(b) by 224 days.

(21) Appl. No.: 17/124,345

(22) Filed: Dec. 16, 2020

(65) Prior Publication Data
US 2021/0166238 A1    Jun. 3, 2021

Related U.S. Application Data

(63) Continuation-in-part of application No. 17/067,570, filed on Oct. 9, 2020, which is a continuation of
(Continued)

(51) Int. Cl.
*G06Q 20/40* (2012.01)
*G06Q 20/38* (2012.01)
(Continued)

(52) U.S. Cl.
CPC ..... *G06Q 20/4016* (2013.01); *G06Q 20/1085* (2013.01); *G06Q 20/3224* (2013.01);
(Continued)

(58) Field of Classification Search
CPC .......... G06Q 20/4016; G06Q 20/1085; G06Q 20/3224; G06Q 20/3226; G06Q 20/38215;
(Continued)

(56) References Cited

U.S. PATENT DOCUMENTS

| 5,708,422 A | 1/1998 | Blonder et al. |
| 5,884,289 A | 3/1999 | Anderson et al. |

(Continued)

FOREIGN PATENT DOCUMENTS

DE    20 2012 013 375 U1    9/2016

OTHER PUBLICATIONS

"NETRESEC Network Security Blog." NETRESEC Network Security Blog. Web. , Mar. 11, 2011.
(Continued)

*Primary Examiner* — Zeshan Qayyum
(74) *Attorney, Agent, or Firm* — Foley & Lardner LLP

(57) ABSTRACT

While mobile device location remains, private, user transaction controls are applied to a specific authorization request. The user transaction controls are pre-configured by the user of the mobile account holder device and identified by the enriched merchant data. Location algorithms predict transaction locations used to obtain enriched merchant data responsive to location privacy mode. Responsive to the user transaction controls, a fraud recommendation response is sent to the approval system, in real time with the transaction. The fraud recommendation response prevents a false negative by using an enriched merchant location rather than the raw merchant location.

16 Claims, 8 Drawing Sheets

Related U.S. Application Data application No. 16/227,560, filed on Dec. 20, 2018, now abandoned, which is a continuation-in-part of application No. 14/058,229, filed on Oct. 19, 2013, now abandoned, and a continuation-in-part of application No. 13/527,544, filed on Jun. 19, 2012, now abandoned, application No. 17/124,345, which is a continuation-in-part of application No. 17/020,685, filed on Sep. 14, 2020, which is a continuation of application No. 14/058,229, filed on Oct. 19, 2013, now abandoned.

(51) Int. Cl.
*G06Q 20/32* (2012.01)
*G06Q 20/10* (2012.01)
*G07F 19/00* (2006.01)

(52) U.S. Cl.
CPC ....... *G06Q 20/3226* (2013.01); *G06Q 20/388* (2013.01); *G06Q 20/38215* (2013.01); *G06Q 20/405* (2013.01); *G06Q 20/4012* (2013.01); *G06Q 20/40145* (2013.01); *G07F 19/206* (2013.01)

(58) Field of Classification Search
CPC ............. G06Q 20/388; G06Q 20/4012; G06Q 20/40145; G06Q 20/405; G07F 19/206
USPC .......................................................... 705/75
See application file for complete search history.

(56) References Cited

U.S. PATENT DOCUMENTS

| | | | |
|---|---|---|---|
| 5,892,900 | A | 4/1999 | Ginter et al. |
| 5,953,710 | A | 9/1999 | Fleming |
| 6,029,154 | A | 2/2000 | Pettitt |
| 6,122,624 | A | 9/2000 | Tetro et al. |
| 6,343,279 | B1 | 1/2002 | Bissonette et al. |
| 6,422,462 | B1 | 7/2002 | Cohen |
| 6,516,056 | B1 | 2/2003 | Justice et al. |
| 6,658,568 | B1 | 12/2003 | Ginter et al. |
| 7,266,537 | B2 | 9/2007 | Jacobsen et al. |
| 7,427,033 | B1 | 9/2008 | Roskind |
| 7,784,684 | B2 | 8/2010 | Labrou et al. |
| 7,793,851 | B2 | 9/2010 | Mullen |
| 7,798,416 | B2 | 9/2010 | Roskind |
| 7,801,826 | B2 | 9/2010 | Labrou et al. |
| 7,813,725 | B2 | 10/2010 | Celik |
| 7,822,688 | B2 | 10/2010 | Labrou et al. |
| 7,828,220 | B2 | 11/2010 | Mullen |
| 8,127,982 | B1 | 3/2012 | Casey et al. |
| 8,417,630 | B2 | 4/2013 | Wolfson et al. |
| 8,706,620 | B2 | 4/2014 | Ciurea |
| 9,324,105 | B2 | 4/2016 | Kopikare et al. |
| 9,674,154 | B1* | 6/2017 | Canavor ............... H04W 12/02 |
| 11,144,982 | B1* | 10/2021 | Raak .................. G06Q 30/0223 |
| 2002/0035539 | A1 | 3/2002 | O'Connell |
| 2002/0082995 | A1 | 6/2002 | Christie, IV |
| 2002/0111886 | A1 | 8/2002 | Chenevich et al. |
| 2002/0123938 | A1 | 9/2002 | Yu et al. |
| 2002/0152123 | A1 | 10/2002 | Giordano et al. |
| 2002/0194141 | A1 | 12/2002 | Langensteiner et al. |
| 2002/0198806 | A1 | 12/2002 | Blagg et al. |
| 2003/0028481 | A1 | 2/2003 | Flitcroft et al. |
| 2004/0039694 | A1 | 2/2004 | Dunn et al. |
| 2004/0068653 | A1 | 4/2004 | Fascenda |
| 2004/0128243 | A1 | 7/2004 | Kavanagh et al. |
| 2004/0215543 | A1 | 10/2004 | Betz et al. |
| 2005/0097019 | A1 | 5/2005 | Jacobs |
| 2005/0102243 | A1 | 5/2005 | Kinsella et al. |
| 2005/0240527 | A1 | 10/2005 | Goldman |
| 2005/0268003 | A1 | 12/2005 | Wang et al. |
| 2006/0085337 | A1 | 4/2006 | Conforti et al. |
| 2006/0178986 | A1 | 8/2006 | Giordano et al. |
| 2007/0039049 | A1 | 2/2007 | Kupferman et al. |
| 2007/0124256 | A1 | 5/2007 | Crooks et al. |
| 2007/0198495 | A1 | 8/2007 | Buron et al. |
| 2008/0101283 | A1 | 5/2008 | Calhoun et al. |
| 2008/0120235 | A1 | 5/2008 | Chu |
| 2008/0147523 | A1 | 6/2008 | Mulry et al. |
| 2008/0222038 | A1 | 9/2008 | Eden et al. |
| 2008/0228648 | A1 | 9/2008 | Kemper et al. |
| 2008/0257952 | A1 | 10/2008 | Zandonadi |
| 2008/0263402 | A1 | 10/2008 | Braysy |
| 2009/0012898 | A1 | 1/2009 | Sharma et al. |
| 2009/0112651 | A1 | 4/2009 | Atkinson |
| 2009/0132424 | A1 | 5/2009 | Kendrick et al. |
| 2009/0138968 | A1 | 5/2009 | Serber |
| 2009/0164327 | A1 | 6/2009 | Bishop et al. |
| 2009/0164330 | A1 | 6/2009 | Bishop et al. |
| 2009/0254462 | A1 | 10/2009 | Tomchek et al. |
| 2009/0313147 | A1 | 12/2009 | Balasubramanian et al. |
| 2010/0022254 | A1 | 1/2010 | Ashfield et al. |
| 2010/0051684 | A1 | 3/2010 | Powers |
| 2010/0063903 | A1 | 3/2010 | Whipple et al. |
| 2010/0106611 | A1 | 4/2010 | Paulsen et al. |
| 2010/0114776 | A1 | 5/2010 | Weller et al. |
| 2010/0153224 | A1 | 6/2010 | Livnat |
| 2010/0274720 | A1 | 10/2010 | Carlson et al. |
| 2010/0325047 | A1 | 12/2010 | Carlson et al. |
| 2011/0047075 | A1 | 2/2011 | Fourez |
| 2011/0137804 | A1* | 6/2011 | Peterson ............ G06Q 30/0603 705/77 |
| 2011/0238564 | A1 | 9/2011 | Lim et al. |
| 2011/0251892 | A1 | 10/2011 | Laracey |
| 2012/0030109 | A1 | 2/2012 | Dooley Maley et al. |
| 2012/0036013 | A1 | 2/2012 | Neuhaus et al. |
| 2012/0059758 | A1 | 3/2012 | Carlson |
| 2012/0066107 | A1 | 3/2012 | Grajetzki |
| 2012/0072347 | A1 | 3/2012 | Conway |
| 2012/0095918 | A1 | 4/2012 | Jurss |
| 2012/0143730 | A1 | 6/2012 | Ansari et al. |
| 2012/0197708 | A1 | 8/2012 | Mullen et al. |
| 2012/0197802 | A1 | 8/2012 | Smith et al. |
| 2012/0225639 | A1 | 9/2012 | Gazdzinski et al. |
| 2012/0271697 | A1 | 10/2012 | Gilman et al. |
| 2012/0303525 | A1 | 11/2012 | Sahadevan |
| 2013/0138516 | A1 | 5/2013 | White |
| 2013/0282593 | A1 | 10/2013 | Merz et al. |
| 2013/0290121 | A1 | 10/2013 | Simakov et al. |
| 2013/0332361 | A1 | 12/2013 | Ciurea |
| 2013/0332362 | A1 | 12/2013 | Ciurea |
| 2013/0346294 | A1 | 12/2013 | Faith et al. |
| 2014/0040135 | A1 | 2/2014 | Ovick et al. |
| 2014/0040139 | A1 | 2/2014 | Brudnicki et al. |
| 2014/0095947 | A1 | 4/2014 | Mozak et al. |
| 2014/0258119 | A1 | 9/2014 | Canis et al. |
| 2014/0279231 | A1 | 9/2014 | Pinski et al. |
| 2014/0279309 | A1 | 9/2014 | Cowen et al. |
| 2014/0279503 | A1 | 9/2014 | Bertanzetti et al. |
| 2014/0304055 | A1 | 10/2014 | Faith |
| 2014/0337175 | A1 | 11/2014 | Katzin et al. |
| 2014/0358769 | A1 | 12/2014 | Howe et al. |
| 2014/0372304 | A1 | 12/2014 | Howe |
| 2015/0045064 | A1 | 2/2015 | Junkar et al. |
| 2015/0242949 | A1 | 8/2015 | Phillips, IV |
| 2015/0332302 | A1 | 11/2015 | Celikyilmaz et al. |
| 2016/0275781 | A1* | 9/2016 | Nold .................... G08B 25/008 |
| 2017/0024743 | A1 | 1/2017 | Fogel et al. |
| 2017/0109745 | A1 | 4/2017 | Al-Bedaiwi et al. |
| 2017/0300894 | A1 | 10/2017 | Shanmugam |
| 2018/0005241 | A1 | 1/2018 | Smothers et al. |
| 2020/0394086 | A1* | 12/2020 | Lee ........................ G06F 3/167 |

OTHER PUBLICATIONS

ISO 8583, Wikipedia, the free encyclopedia, retrieved on Jun. 9, 2011 from https://web.archive.org/web/20110609034342/https://en.wikipedia.org/wiki/ISO_8583 (Year: 2011).

Radu, Implementing Electronic Card Payment Systems, Artech House, 2002. Chapter 2 (Year: 2002).

(56) References Cited

OTHER PUBLICATIONS

Ranjan, "Tokenization of a physical debit or credit card for payment", IP.com, 2007, 10 pages. https://priorart.ip.com/IPCOM/000251283.

* cited by examiner

ENRICHING TRANSACTION REQUEST DATA FOR MAINTAINING LOCATION PRIVACY WHILE IMPROVING FRAUD PREVENTION SYSTEMS ON A DATA COMMUNICATION NETWORK WITH USER CONTROLS INJECTED TO BACK-END TRANSACTION APPROVAL REQUESTS IN REAL-TIME WITH TRANSACTIONS

CROSS-REFERENCE TO RELATED APPLICATIONS

This application claims priority to and is a continuation in part of U.S. application Ser. No. 17/067,570 filed Oct. 9, 2020 entitled REAL-TIME ENRICHMENT OF RAW MERCHANT DATA FROM ISO TRANSACTIONS ON DATA COMMUNICATION NETWORKS FOR PREVENTING FALSE DECLINES IN FRAUD PREVENTION SYSTEMS, by Vaduvur Bharghavan et al., which is a continuation of U.S. application Ser. No. 16/227,560 filed Dec. 20, 2018 entitled REAL-TIME ENRICHMENT OF RAW MERCHANT DATA FROM ISO TRANSACTIONS ON DATA COMMUNICATION NETWORKS FOR PREVENTING FALSE DECLINES IN FRAUD PREVENTION SYSTEMS, by Vaduvur Bharghavan et al., which is a continuation in part of U.S. application Ser. No. 14/058,229 filed Oct. 19, 2013 entitled SYSTEM AND METHOD FOR AUTHORIZING A TRANSACTION BASED ON DYNAMIC LOCATION UPDATES FROM A USER DEVICE, by Vaduvur Bharghavan and is a continuation-in-part of co-pending U.S. application Ser. No. 13/527,544 filed Jun. 19, 2012 entitled SYSTEM AND METHOD FOR PAYMENT AUTHORIZATION CONTROL, by Rachna Ahlawat; and as a continuation-in-part to U.S. application Ser. No. 17/020,685 filed Sep. 14, 2020 entitled SYSTEM AND METHOD FOR AUTHORIZING A TRANSACTION BASED ON DYNAMIC LOCATION UPDATES FROM A USER DEVICE, by Vaduvur Bharghavan, which is a continuation to U.S. application Ser. No. 14/058,229 filed Oct. 19, 2013 entitled SYSTEM AND METHOD FOR AUTHORIZING A TRANSACTION BASED ON DYNAMIC LOCATION UPDATES FROM A USER DEVICE, by Vaduvur Bharghavan, the contents of each being hereby incorporated by reference in their entirety.

FIELD OF THE INVENTION

The invention relates generally, to computer networking security, and more specifically, to real-time enrichment of raw merchant data from an ISO (International Organization for Standardization) transaction for preventing a false decline in a fraud prevention system.

BACKGROUND

A major chilling effect on conducting online transactions is the vulnerability of transaction fraud from rogue network components. Rogue devices and rogue users can attempt to conduct fraudulent transactions without an account holder's permission. One solution to preventing transaction fraud is to maintain user accounts in a disabled state and selectively enabling accounts for any transactions to be considered, whether legitimate or not, as described in U.S. application Ser. No. 13/527,544.

However, once a user account is enabled, the content of a particular transaction still must be scrutinized for legitimacy. Unfortunately, many legitimate transactions are declined when fraud prevention methods are overly aggressive in the prevention of illegitimate transactions, and this can also have a chilling effect on online transactions.

Furthermore, card users have privacy concerns when making transactions with merchants, and for other reasons. To this end, location services are often disabled on mobile devices. Location privacy can be asserted by turning off locationing hardware such as GPS, Wi-Fi triangulation, cell tower triangulation, IP address locationing, or the like. Another location privacy mechanism blocks software apps from accessing location data on mobile devices from an operating system.

What is needed is a robust technique for maintaining location privacy while improving fraud prevention systems by reducing false declines in fraud prevention systems with real-time enrichment of raw merchant data from ISO transactions on a data communication network.

SUMMARY

To address the above-mentioned shortcomings, methods, computer-readable mediums, and devices are provided for real-time enrichment of raw merchant data from an ISO transaction for maintaining location privacy while preventing a false decline in a fraud prevention system.

In an embodiment, data packets are received from a transaction approval system and in real-time with a transaction remotely occurring between a transaction-initiating device and a mobile account holder device. The data packets comprise a fraud recommendation request responsive to a specific authorization request having data fields formatted according to a protocol format, and submitted by the transaction-initiating device to the transaction approval system including a merchant location. The transaction-initiating device controls values within the data fields of the specific authorization request. The processor detects that the mobile account holder device is in location privacy mode that will not provide a current geo-location independent of a location provided by the transaction-initiating device for verification.

In another embodiment, responsive to the location privacy mode detection, a location of the mobile account holder is predicted from previous ISO transaction locations similar to the real-time transaction. The raw merchant data of the authorization request is enriched with normalized merchant data according to the predicted location, including enriching the raw merchant location, by contacting a location-based index of normalized merchant data.

In yet another embodiment, user transaction controls are applied to the specific authorization request, the user transaction controls being pre-configured by the user of the mobile account holder device and identified by the enriched merchant data. Responsive to the user transaction controls, a fraud recommendation response is sent to the approval system, in real time with the transaction. The fraud recommendation response prevents a false negative by using the enriched merchant location rather than the raw merchant name.

Advantageously, the technical field of data network security is improved by reducing falsely declined transactions. Moreover, one technical field improves another technical field by using machine learning to improve network security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Transaction validation servers, computer-implemented methods, and (non-transitory) computer-readable mediums for real-time enrichment of raw merchant data from an ISO transaction for preventing a false decline in a fraud prevention system, are disclosed.

The examples detailed herein are non-limiting and concise. For example, although fraud detection is referred to herein as a technology that is improved by the techniques disclosed below, many other technologies such as dispute resolution and card controls, are also improved. Moreover, merchant transactions in the ISO 8583 format for network data packets can also be applied to non-merchant transactions and other packet formats. In addition to reducing false declines, fewer erroneous approvals are output.

Figure 2:
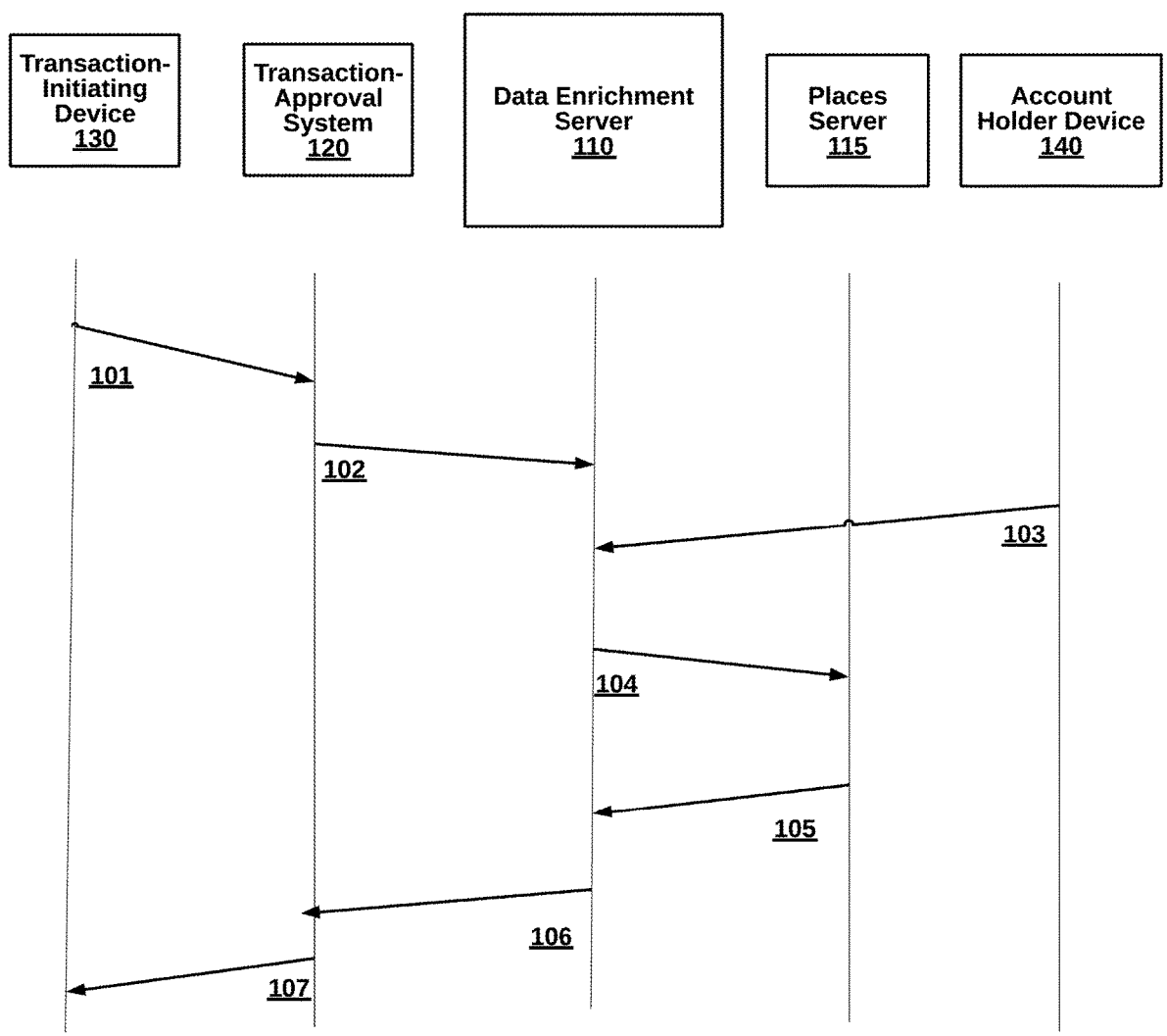
FIG. 2 is a sequence diagram illustrating interactions between the components of the system of FIG. 1, according to an embodiment.
Figure 3:
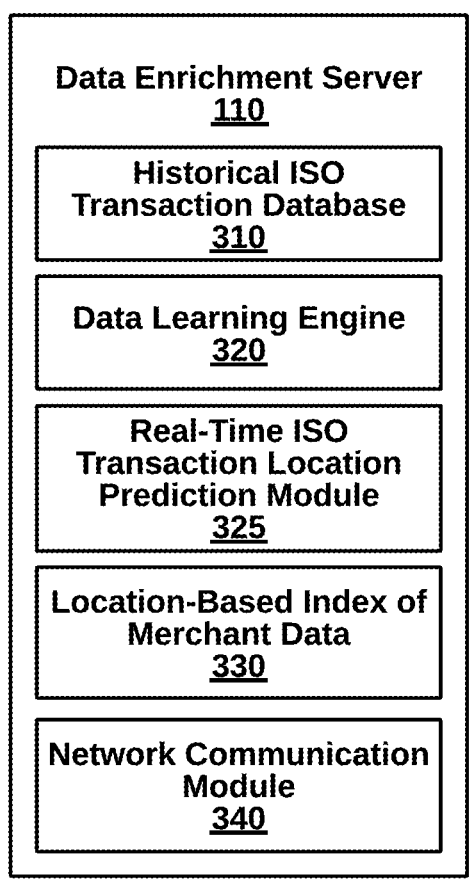
FIG. 3 is a more detailed block diagram illustrating a data enrichment server of the system of FIG. 1, according to some embodiments.

I. System for Real-Time Enrichment of ISO Transactions (FIGS. 1-3)

Figure 1:
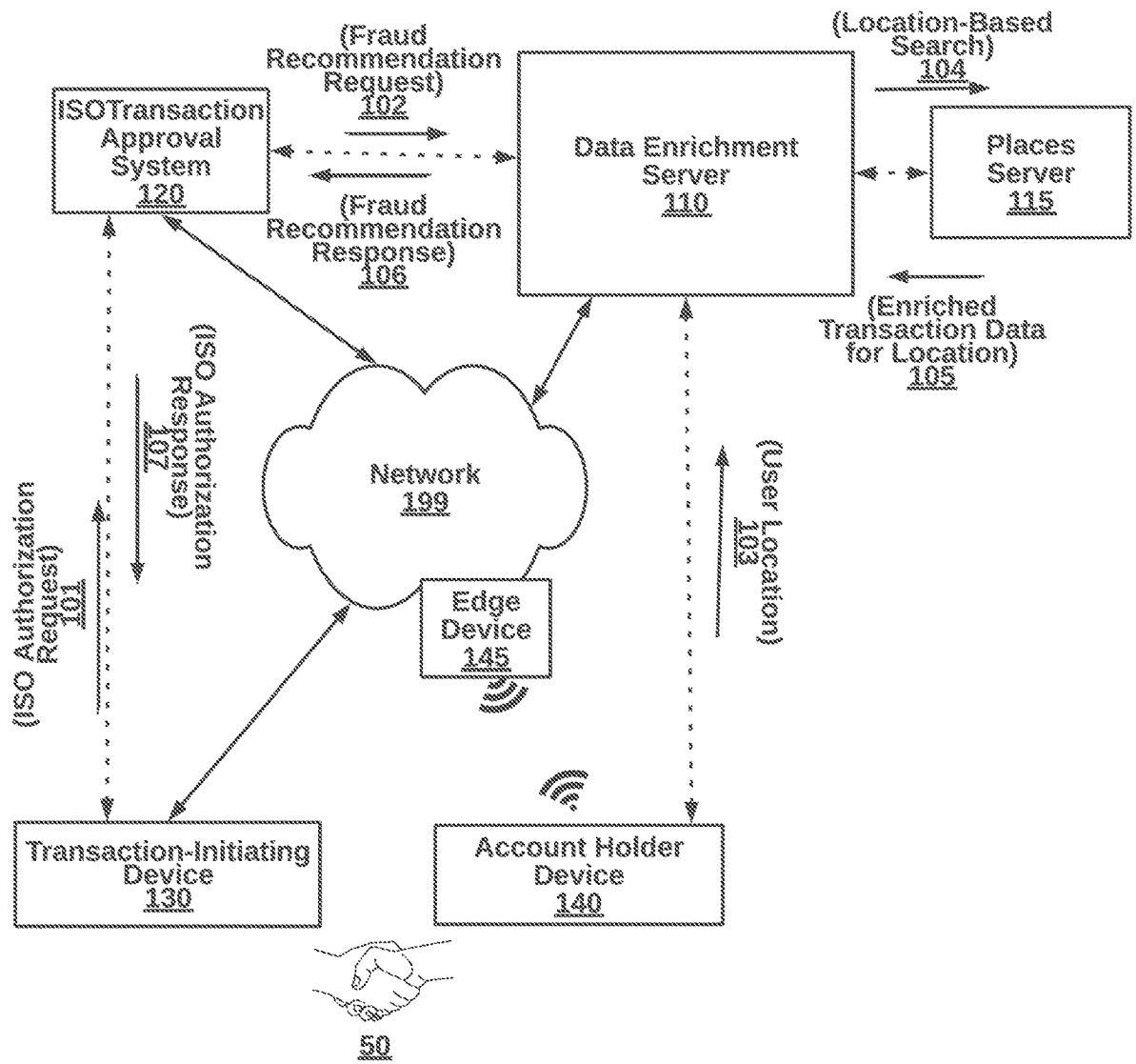
FIG. 1 is a high-level block diagram illustrating a system for real-time enrichment of raw merchant data from an ISO transaction for preventing a false decline in a fraud prevention system, according to an embodiment.

FIG. 1 is a high-level block diagram illustrating a system 100 for real-time enrichment of raw merchant data from an ISO transaction for preventing a false decline in a fraud prevention system, according to an embodiment. The system 100 primarily comprises a data enrichment server 110, a transactional approval system 120, a transaction-initiating device 130 and an account holder device 140. Additional network components can also be part of the system 100, such as firewalls, virus scanners, routers, switches, application servers, databases, as well as additional controllers, access points, access switches, stations, SDN (Software-Defined Networking) controllers, Wi-Fi controllers, and the like. The network components can be implemented as hardware, software, or a combination of both, for example, as described with respect to the computing environment of FIG. 6.

Each of the primary components are coupled in communication through a network 199. The account holder device 140 may be a mobile device that couples to an edge device 149 for access to the network 199. In addition, the network 199 may be the Internet or a cellular network in one case and may be a hybrid network in another case.

The data enrichment server 110, in one embodiment, receives a fraud recommendation request 101 with a copy of an ISO authorization request 101 and responds with a fraud recommendation response 101. To determine a recommendation, the data enrichment server 110 can extract raw merchant data from the ISO authorization request. The raw merchant data is typically customized by a particular merchant and their business practice, or there is any protocol at all. Enriched merchant data, on the other hand, is normalized with known commercial names. It is the enriched merchant data from which more accurate fraud recommendations can be made, resulting in fewer false declines, among other advantages. In another embodiment, the data enrichment server 110 sends enriched merchant data to the transaction approval system 120 for fraud processing. While raw merchant data can have 2, 10 or more variations, enriched merchant data is coalesced under a single entry. When a customer wants to dispute a transaction at Walmart, for example, all the transactions and actions are accessible under a single commercial name rather than having to individually check each name and decipher raw merchant data.

The user location 103 for the account holder device 140 can be pushed or pulled and utilized to filter search results of a places server 119. For example, a data field has WLMRT within close proximity to a known Walmart store, the custom abbreviation can be enriched to the common trade name. The location is preferably in real-time with data enrichment, but in some cases, is done asynchronously. GPS, Wi-Fi triangulation, IP address analyses, or other techniques at the account holder device 140 determines local geo-coordinates and sends to the data enrichment server 110. In one case, the data enrichment server 110 uses algorithms to predict the location based on previous locations. In another case, the data enrichment server 110 infers location from the merchant location, IP address, or any other appropriate technique.

In some embodiments, the data enrichment server 110 is part of a third-party fraud detection system, separate from the fraud detection system of the transaction approval system 120. This allows users to directly affect controls for fraud through the third-party access that is not available from the transaction approval system 120 fraud processes. The data enrichment server 110 is set forth in more detail with respect to FIG. 2 below.

The transactional approval system 120, in an embodiment, is a backend to a payment authorization system for credit card transactions for a merchant at a POS. The financial transaction approval system can include an acquirer processor, a card network, an issuer processor, a card issuer, and an account host. Responsive to a transaction initiated at the merchant, the acquirer processor can send the ISO authorization request according to the ISO 8583 standard, including a x100 or a x200 message type, with a transaction card number, transaction card credentials, merchant information, transaction amount, and other mandatory and optional fields. The card network does validity checks on the ISO authorization request and involves any additional services the acquirer or issuer have signed up for (such as address validation, PIN validation, risk scoring, and the like), and then forward the ISO authorization request to the issuer processor. The issue processor can perform validity checks and invoke value-added services such as risk scoring and cardholder policy checks, before checking with an account host if a user account has adequate funds to satisfy a transaction request. The account host responds to the issuer processor with an approval or denial that the issuer processor can form into an ISO authorization response, along with a approve or denial reason code. The card network forwards the ISO authorization response to the acquirer processor, and in turn, back to the merchant at the POS. Many other approval systems are possible.

Conventional payment authorization systems typically block out the user device 140 from participation in approvals through payment controls. By contrast, the data enrichment server 110 is able to implement controls of the user device 140 by registering a user account with a third party administrating the data enrichment server 110.

The transaction-initiating device 130, can be a merchant device or other point of sale, where a merchant swipes a transaction card through a transaction card reader which uses transceiver coupled to the network 199 for transmitting an ISO authorization request to the transaction approval system 120 for approval.

The account holder device 140 can be a user device such as a mobile telephone, electronic payment device, an iPad, laptop computer, or the like. A user logs onto the data enrichment server 110 with authentication credentials to create a secure channel for location sharing, changing transaction controls, and managing transactions. In one implementation, a mobile application is downloaded to the account holder device 140 for communication with the data enrichment server 110. In another embodiment, an operating system or Bluetooth-connected device communicates with the data enrichment sever 110.

FIG. 2 is a sequence diagram illustrating interactions between the components of the system of FIG. 1, according to an embodiment. Variations in the sequence are possible.

At interaction 101, the transaction-initiating device 130 receives data from a payment card swipe by the merchant or the user (or Apple Pay, an NFC contactless swipe, or otherwise) thereby initiating the network security techniques descried herein. Data packets including an ISO authorization request are sent to the transactional-approval system. The transmission channel can be, for example, an end-to-end wired connection, a Wi-Fi or other wireless connection, or a hybrid network.

At interaction 102, a copy of the ISO authentication request is sent to the data enrichment host server 110 in order to receive a fraud recommendation and in response a user device location can be pulled (or pushed) from account holder device 140. A location privacy notification is sent from the account holder device 140, at interaction 103. Other means of privacy mode detection are possible. A search query is sent to the place server 115 at interaction 104 and a response is sent back at interaction 105. Payment controls, fraud prevention scoring, or other processes can be applied at this point using enriched merchant data. At interaction 106, a fraud recommendation is sent back to the transaction approval system 120. At interaction, 107 the ISO authorization response is sent to the transaction-initiating device 130. In response, a release of goods to the user can be allowed or disallowed by the merchant, in one example.

FIG. 3 is a more detailed block diagram illustrating a data enrichment server 110 of FIG. 1, according to some embodiments. The data enrichment server 110 includes a historical ISO transactional database 310, a data learning engine 320, real-time ISO transaction location prediction module 325, a location-based index of merchant data 330 and a network communication module 340. The components can be implemented in hardware, software, or a combination.

The historical ISO transactional database 310 stores previous ISO authentication requests and responses for training the data learning engine 320. The previous transactions can be limited to a specific user, a specific location (e.g., zip code, city or state), a specific transaction type (e.g., recurring transactions, in-store transactions), or as otherwise needed for a specific implementation. For example, if a user visits Starbucks mostly at a certain location, that known location can replace an incorrect location reported by ISO 8583 in a specific transaction authorization request, as enriched merchant data. Starbucks may use a regional address for all regional locations or even one national address for all US locations, and this is sent as merchant location rather than an actual location, in some instances.

The data learning engine module 320 uses previous locations to build a model for predicting current locations. The real-time ISO transaction location prediction module 325 processes real-time transactions using prediction models output by the data learning engine 320. In the Starbucks example, machine learning inputs a transaction amount, combined with a merchant name, factors on how to update a raw merchant address with a more accurate address, i.e., an enriched merchant address. Whereas the raw merchant address would be a mismatch with a current location of a mobile device causing a transaction denial, the enriched location may be a match causing a transaction approval.

In one embodiment, a list of potential locations is identified along with an estimation of accuracy. A threshold level of accuracy can be required, in some embodiments, such that no location is selected for a particular ISO transaction. In other embodiments, a real-time message can be sent to a user asking for a location to be confirmed, or to manually select a location from a group of potential locations. If not used in real-time, the manual selection can be used for model training data for subsequent real-time transactions. The list of potential locations can be identified responsive to detecting a privacy mode. The location privacy mode can be detected by a denial of location request, in one instance. The location privacy mode can also be set as an account parameter on the data enrichment server 110.

Referring again to FIG. 3A, the location-based index of merchant data 330 is generated from the learning process as varying merchant names are coalesced under a single name, and payment controls are implemented through the single name. Being local to the data enrichment server 110, one embodiment provides real-time look-up of enriched merchant data and when there is a cache miss, raw merchant data is used for making decisions. The enriched data can be retrieved form the places server 115. Preferably, the data enrichment server 110 is under independent control from the transaction approval system 120. As a result, the location-based index is controlled and leveraged by the user typically precluded from the ISO transaction data path.

The network communication module 340 can include a network interface, transceivers, antenna, protocol software, APIs and other aspects necessary II. Methods for Real-Time Enrichment of ISO Transactions (FIGS. 4-5)

Figure 4:
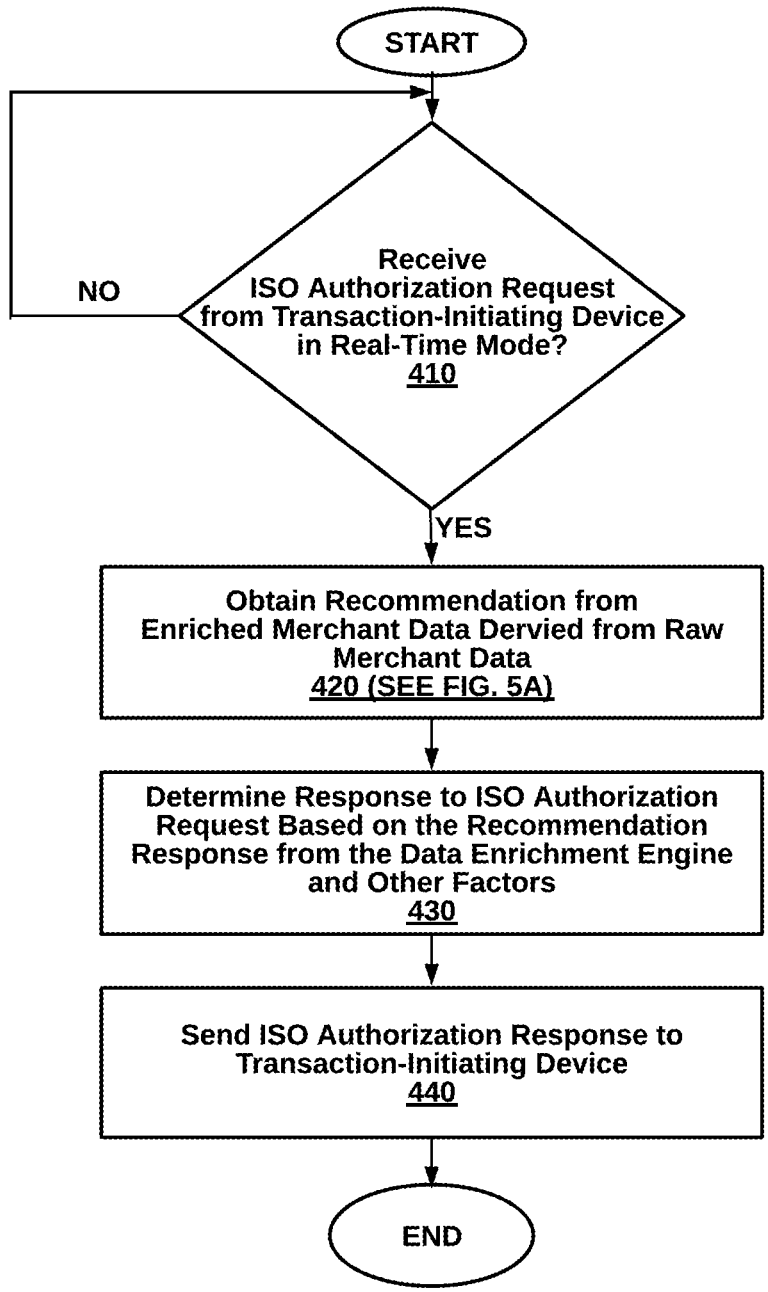
FIG. 4 is a high-level flow diagram illustrating a method for real-time enrichment of raw merchant data from an ISO transaction for preventing a false decline in a fraud prevention system, according to an embodiment.

FIG. 4 is a high-level flow diagram illustrating a method 300 for real-time enrichment of raw merchant data from an ISO transaction for preventing a false decline in a fraud prevention system, according to an embodiment. The method 300 can be implemented by, for example, the system 100 of FIG. 1.

At step 410, in response to an ISO authorization request is obtained from a transaction-initiating device in real-time mode from a merchant device initiating a transaction, a recommendation based on enriched merchant data derived from raw merchant data, is requested at step 420.

At step 430, a response to the ISO authorization request is determined based at least in part of the recommendation. In some implementation, other local controls and preferences are also taken into account, such as amount of credit available for a specific user.

At step 440, the ISO authorization response is sent to the merchant. Results can be stored for batch processing at a later time. Additional verifications of the transaction or disputes submitted by users can also be stored for analyses.

Figure 5A:
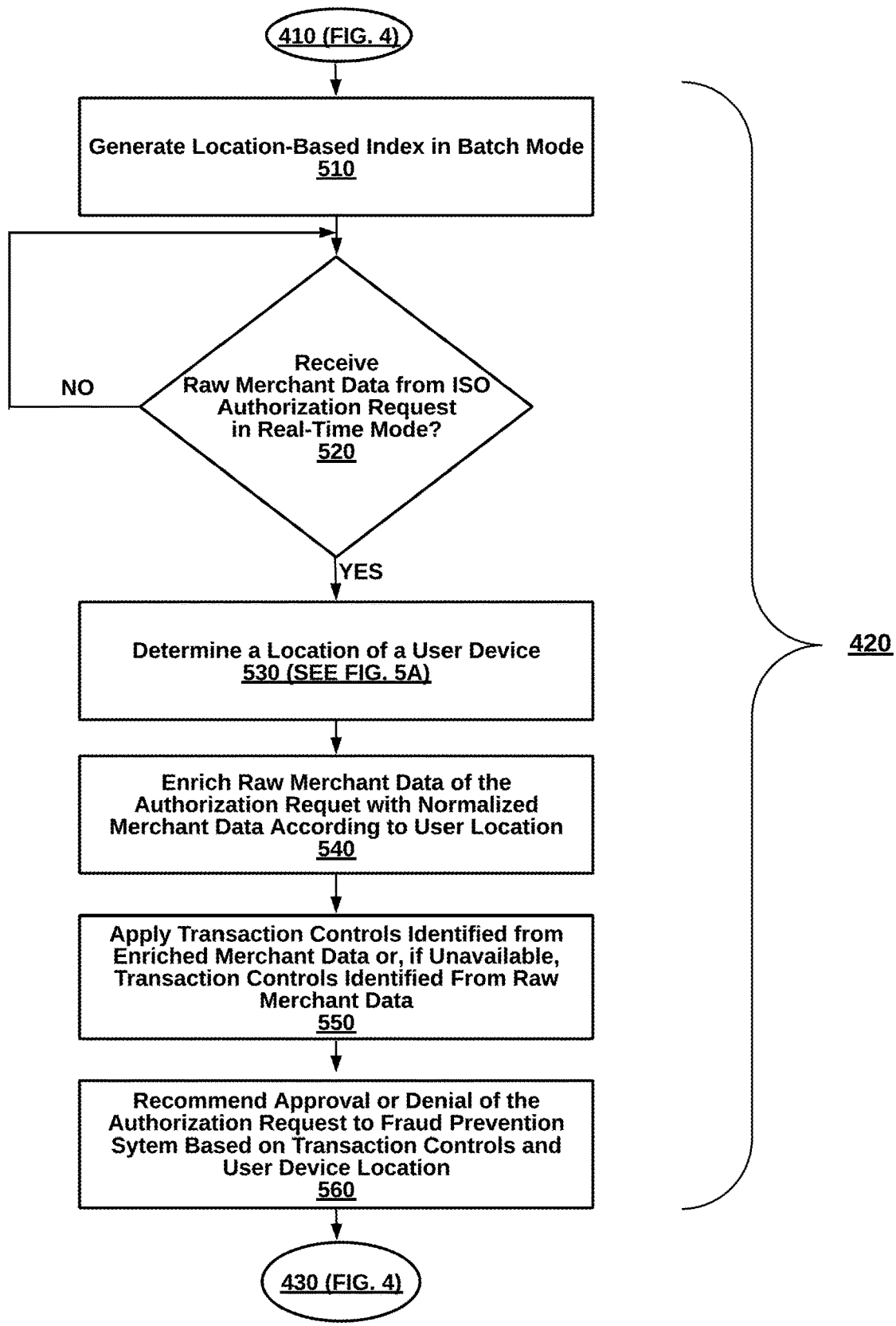
FIG. 5A is a more detailed flow diagram describing the step of the fraud prevention system requesting a recommendation from the data enrichment server, according to an embodiment.
Figure 5B:
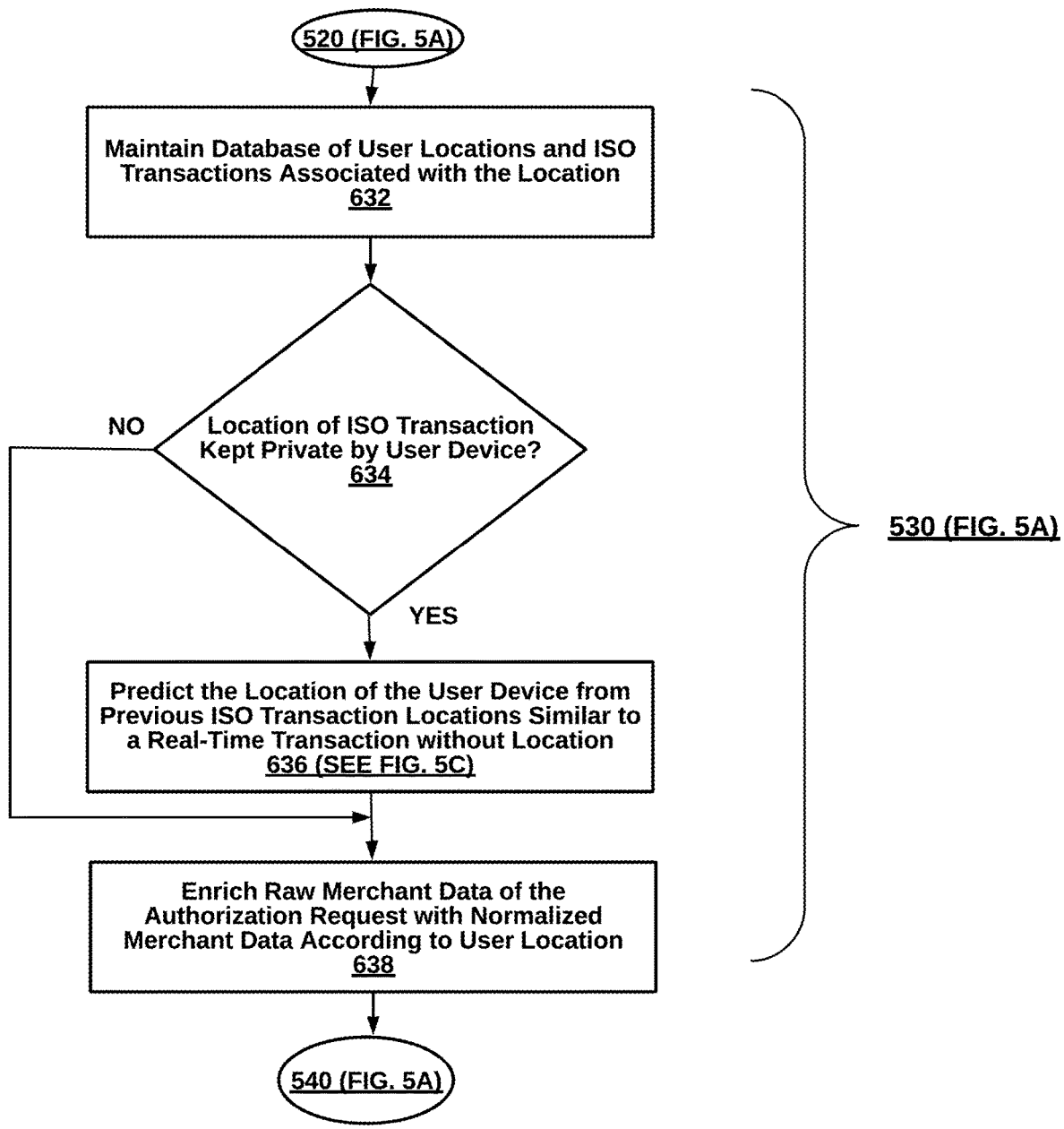
FIG. 5B is a high-level flow diagram illustrating a step of determining a user location, in the method of FIG. 5A, according to an embodiment.
Figure 5C:
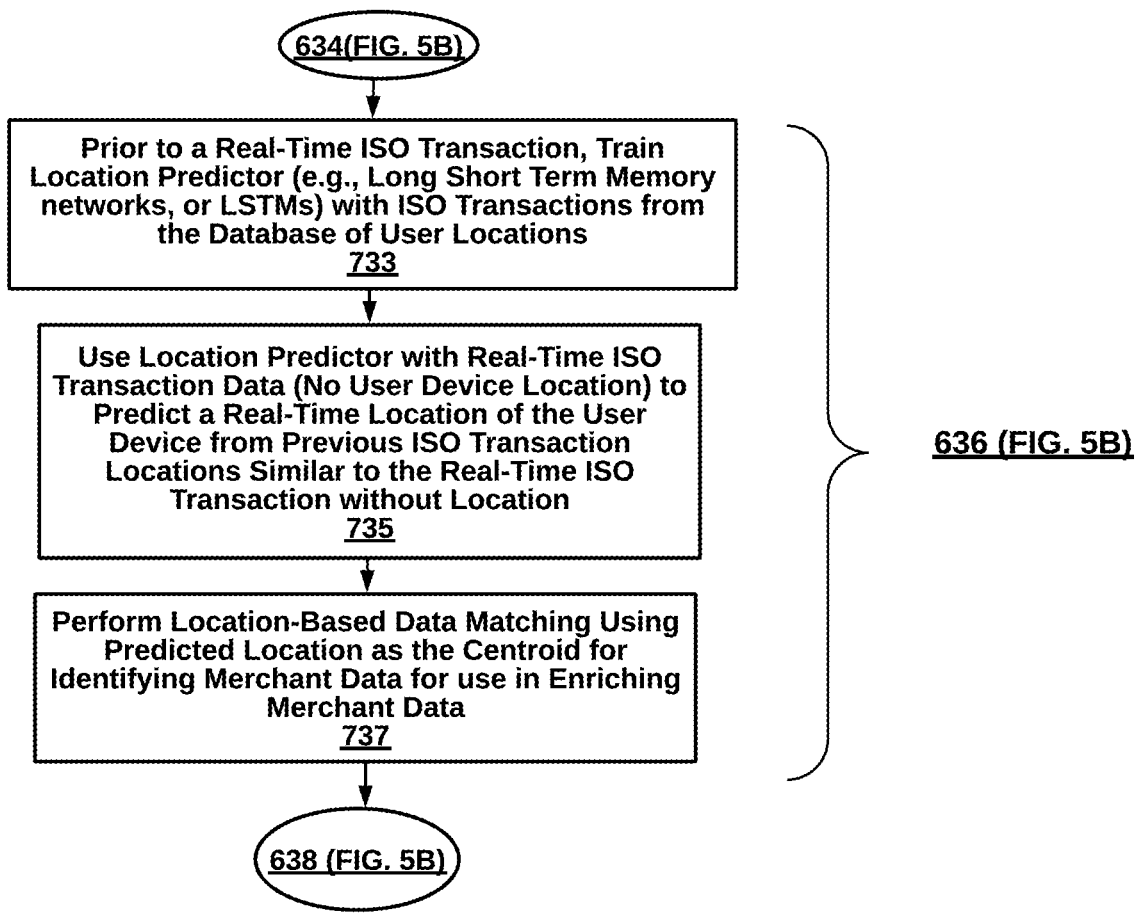
FIG. 5C is a high-level flow diagram illustrating a step of predicting the location of the user device from previous ISO transaction locations of FIG. 5B, according to an embodiment.

FIG. 5A is a more detailed flow diagram describing the step 420 of the fraud prevention system requesting a recommendation from the data enrichment server from FIG. 3, according to an embodiment.

At step 510, a location-based index is generated in batch mode. At step 520, responsive to receiving raw merchant data parsed from an ISO authorization request for a transaction in process, a location of a user device is determined while maintaining location privacy at step 530. At step 540, raw merchant data is enriched with normalized merchant data according to the user location.

At step 550, transaction controls (or transaction rules, or user preferences) can be identified and applied in order to make a recommendation, at step 560. For example, a card present mode has different payment controls than a card not present mode. Co-location of a transaction card and a user device may be required in the card present mode. While the raw merchant data of WMRT345 may not be part of a location-based index, a look-up at a Google Places server or other database using the user device location can allow normalization of the merchant name to Walmart, a name that is part of the location-based index. Additional data can also be gleaned from the Google Places server such as merchant location, and factors for determining terminal type. The additional data may further affect the payment controls applied to make an even more accurate recommendation. As a result, false declines of the transaction are prevented. Many other examples are possible.

Returning to step 530, FIG. 5B is a high-level flow diagram illustrating the step 530 of determining a user location, in the method of FIG. 5A, according to an embodiment. More specifically, at step 632 a database is maintained of user locations and ISO transactions associated with the location. At step 634, if the location of the ISO transaction is kept private by the device, the location of the user device is predicted from previous ISO transaction locations similar to the real-time transaction without the location. At step 638, raw merchant data of the authorization request is enriched with normalized merchant data according to user location.

Returning to step 636, FIG. 5C is a high-level flow diagram illustrating the step 636 of predicting the location of the user device from previous ISO transaction locations of FIG. 8B, according to an embodiment. Here, at step 733, prior the real-time transaction, a location predictor is trained with ISO transactions from the database of user locations. At step 735, the location predictor is used with real-time ISO transaction data to predict a real-time location of the user device from previous locations similar to the real-time ISO transaction without location. At step 737, location-based matching is performed using the predicted location as the centroid for identifying merchant data for use in enriching raw merchant data.

III. Generic Computing Device (FIG. 6)

Figure 6:
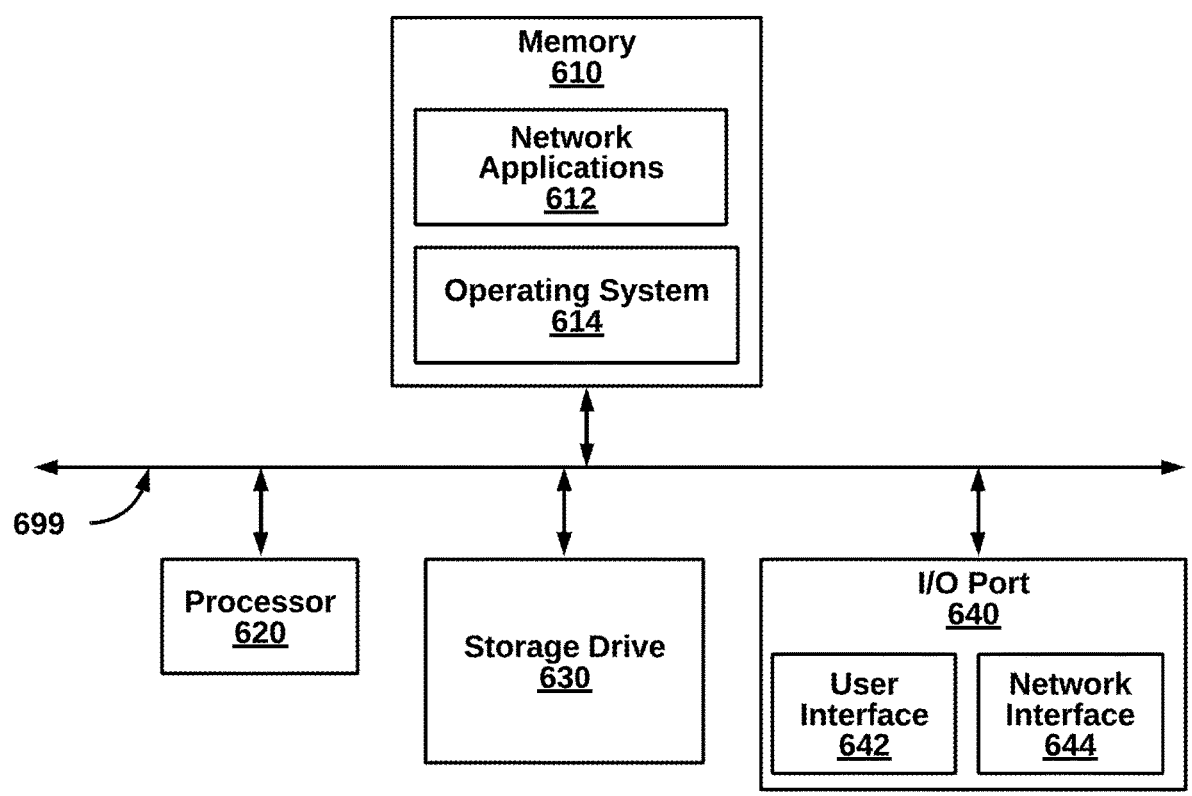
FIG. 6 is a block diagram illustrating an exemplary computing device, according to one embodiment.

FIG. 6 is a block diagram illustrating an exemplary computing device 600 for use in the system 100 of FIG. 1, according to one embodiment. The computing device 500 is an exemplary device that is implementable for each of the components of the transaction validation server unit 110, including the historical transaction database 310, account configuration module 320, the deviation determination engine 330, and network communication module 340. Additionally, the computing device 500 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 512 and an operating system 614. The network applications 612 can include a web browser, a mobile application, an application that uses networking, a remote application executing locally, a network protocol application, a network management application, a network routing application, or the like.

The operating system 614 can be one of the Microsoft Windows®. family of operating systems (e.g., Windows 95, 98, Me, Windows NT, Windows 2000, Windows XP, Windows XP x64 Edition, Windows Vista, Windows CE, Windows Mobile), Windows 7, Windows 8, Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage device 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The account holder interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

We claim:

1. A non-transitory computer-readable media comprising computer-readable instructions stored thereon that when executed by one or more processors cause the one or more processors to:
   receive a payment authorization request from a transaction-initiating device for a current transaction by a user, wherein the current transaction is associated with a merchant;
   determine, upon receiving the payment authorization request, that a location privacy mode of a mobile device of the user is turned on, wherein in the location privacy mode, the mobile device does not provide a current location of the mobile device, wherein the determination that the location privacy mode is enabled is made by:
      sending a location request to the mobile device; and
      receiving a location privacy notification in response to the location request, wherein the location privacy notification is indicative of the location privacy mode being enabled;
   predict, upon determining that the location privacy mode is enabled, the current location of the mobile device by:
      analyzing data associated with prior transactions by the user to identify one or more of the prior transactions that correspond to transaction information of the current transaction, wherein the transaction information is determined from the payment authorization request;
      determining one or more potential locations corresponding to the one or more of the prior transactions based on the analyzing;
      sending at least one of the one or more potential locations to the mobile device for requesting location confirmation of the mobile device; and
      setting one of the at least one of the one or more potential locations as the current location based on the location confirmation;
   identify raw merchant data associated with the merchant based on the current location of the mobile device;
   normalize the raw merchant data to obtain enriched merchant data;
   identify one or more transaction control rules defined by the user from the enriched merchant data to be applied to the current transaction;
   apply the one or more transaction control rules to the payment authorization request; and
   approve or deny the payment authorization request based on whether the payment authorization request satisfies the one or more transaction control rules or not.

2. The non-transitory computer-readable media of claim 1, wherein the data associated with the prior transactions comprises at least one of user information of the user, location information of the prior transactions, and transaction type.

3. The non-transitory computer-readable media of claim 1, wherein to predict the current location of the mobile device, the one or more processors further execute computer-readable instructions to:
   submit one or more attributes determined based on the current transaction into a machine learning model that has been trained using the prior transactions; and
   receive the one or more potential locations as output from the machine learning model.

4. The non-transitory computer-readable media of claim 1, wherein sending the at least one of the one or more potential locations to the mobile device for requesting location confirmation of the mobile device further comprises:
   selecting one location from the one or more potential locations for sending to the mobile device, wherein the one location is selected based on an estimation of accuracy determined by comparing each of the one or more potential locations to a threshold level; and
   receiving the location confirmation from the mobile device in response to sending the one location, wherein the one of the at least one of the one or more potential locations is the one location.

5. The non-transitory computer-readable media of claim 1, wherein sending the at least one of the one or more potential locations to the mobile device for requesting location confirmation of the mobile device further comprises:
   selecting a group of the one or more potential locations for sending to the mobile device, wherein the group of the one or more potential locations is selected based on an estimation of accuracy determined by comparing each of the one or more potential locations to a threshold level; and
   receiving the location confirmation from the mobile device, wherein the location confirmation selects one location from the group of the one or more potential locations, wherein the one of the at least one of the one or more potential locations is the one location.

6. The non-transitory computer-readable media of claim 1, wherein the enriched merchant data comprises a normalized merchant name associated with a plurality of raw merchant names.

7. The non-transitory computer-readable media of claim 1, wherein the enriched merchant data comprises a normalized merchant address associated with a plurality of raw merchant addresses.

8. The non-transitory computer-readable media of claim 1, wherein to apply the one or more transaction control rules to the payment authorization request, the one or more processors further execute computer-readable instructions to:

determine a transaction location of the current transaction from the payment authorization request;

compare the current location of the mobile device with the transaction location; and approve the payment authorization request upon finding a match between the transaction location and the current location of the mobile device.

9. A system comprising:

one or more memories having computer-readable instructions stored thereon; and one or more processors that execute the computer-readable instructions to:

receive a payment authorization request from a transaction-initiating device for a current transaction by a user, wherein the current transaction is associated with a merchant;

determine, upon receiving the payment authorization request, that a location privacy mode of a mobile device of the user is turned on, wherein in the location privacy mode, the mobile device does not provide a current location of the mobile device, wherein the determination that the location privacy mode is enabled is made by:

sending a location request to the mobile device; and receiving a location privacy notification in response to the location request, wherein the location privacy notification is indicative of the location privacy mode being enabled;

predict, upon determining that the location privacy mode is enabled, the current location of the mobile device by:

analyzing data associated with prior transactions by the user to identify one or more of the prior transactions that correspond to transaction information of the current transaction, wherein the transaction information is determined from the payment authorization request;

determining one or more potential locations corresponding to the one or more of the prior transactions based on the analyzing;

sending at least one of the one or more potential locations to the mobile device for requesting location confirmation of the mobile device; and setting one of the at least one of the one or more potential locations as the current location based on the location confirmation;

identify raw merchant data associated with the merchant based on the current location of the mobile device;

normalize the raw merchant data to obtain enriched merchant data;

identify one or more transaction control rules defined by the user from the enriched merchant data to be applied to the current transaction;

apply the one or more transaction control rules to the payment authorization request; and approve or deny the payment authorization request based on whether the payment authorization request satisfies the one or more transaction control rules or not.

10. The system of claim 9, wherein the data associated with the prior transactions comprises at least one of user information of the user, location information of the prior transactions, and transaction type.

11. The system of claim 9, wherein to predict the current location of the mobile device, the one or more processors further execute computer-readable instructions to:

submit one or more attributes determined based on the current transaction into a machine learning model that has been trained using the prior transactions; and receive the one or more potential locations as output from the machine learning model.

12. The system of claim 9, wherein sending the at least one of the one or more potential locations to the mobile device for requesting location confirmation of the mobile device further comprises:

selecting one location from the one or more potential locations for sending to the mobile device, wherein the one location is selected based on an estimation of accuracy determined by comparing each of the one or more potential locations to a threshold level; and receiving the location confirmation from the mobile device in response to sending the one location, wherein the one of the at least one of the one or more potential locations is the one location.

13. The system of claim 9, wherein sending the at least one of the one or more potential locations to the mobile device for requesting location confirmation of the mobile device further comprises:

selecting a group of the one or more potential locations for sending to the mobile device, wherein the group of the one or more potential locations is selected based on an estimation of accuracy determined by comparing each of the one or more potential locations to a threshold level; and receiving the location confirmation from the mobile device, wherein the location confirmation selects one location from the group of the one or more potential locations, wherein the one of the at least one of the one or more potential locations is the one location.

14. The system of claim 9, wherein the enriched merchant data comprises a normalized merchant name associated with a plurality of raw merchant names.

15. The system of claim 9, wherein the enriched merchant data comprises a normalized merchant address associated with a plurality of raw merchant addresses.

16. The system of claim 9, wherein to apply the one or more transaction control rules to the payment authorization request, the one or more processors further execute computer-readable instructions to:

determine a transaction location of the current transaction from the payment authorization request;

compare the current location of the mobile device with the transaction location; and approve the payment authorization request upon finding a match between the transaction location and the current location of the mobile device.

* * * * *